R. F. GOECKE.
FLUID JACKETED KETTLE.
APPLICATION FILED MAR. 21, 1916.
1,270,406.
Patented June 25, 1918.
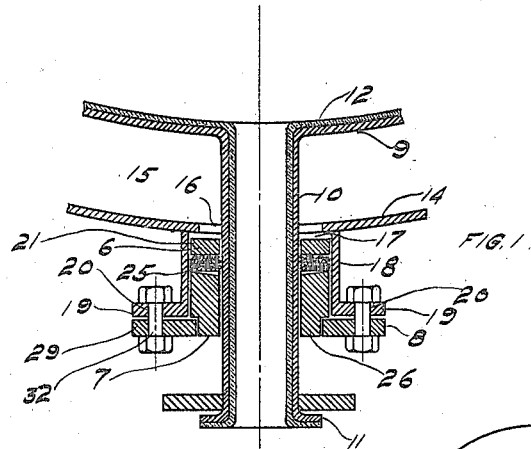
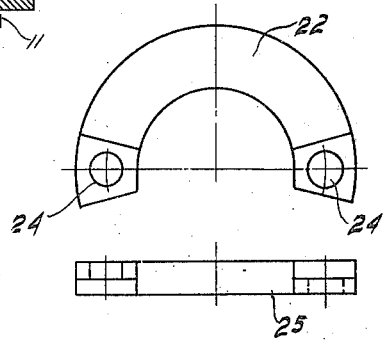
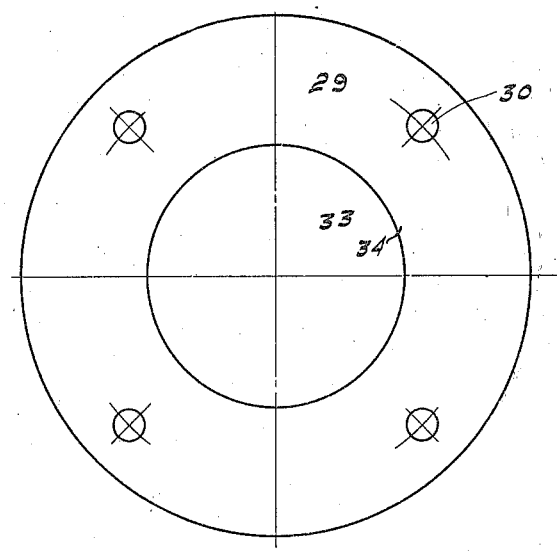
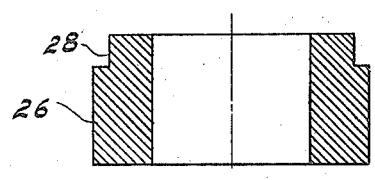
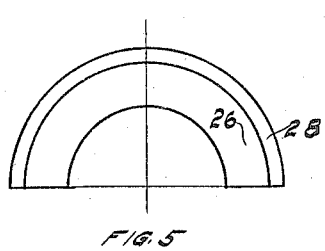

UNITED STATES PATENT OFFICE.

RUDOLF F. GOECKE, OF ELYRIA, OHIO, ASSIGNOR TO THE ELYRIA ENAMELED PRODUCTS COMPANY, OF ELYRIA, OHIO, A CORPORATION OF OHIO.

FLUID-JACKETED KETTLE.

1,270,406.   Specification of Letters Patent.   Patented June 25, 1918.

Application filed March 21, 1916. Serial No. 85,620.

*To all whom it may concern:*

Be it known that I, RUDOLF F. GOECKE, a subject of the Emperor of Germany, residing at Elyria, in the county of Lorain and State of Ohio, have invented certain new and useful Improvements in Fluid-Jacketed Kettles; and I do hereby declare the following to be a full, clear, and exact description of the invention, such as will enable others skilled in the art to which it appertains to make and use the same.

My invention relates to fluid jacketed kettles and to means for associating the kettle and jacket together. In a great many industries kettles are associated with jackets so that a chamber is formed between the kettle and jacket walls in which chamber a heating medium is introduced for the purpose of heating the contents of the kettle. This heating medium may be either a liquid or a gas. In a great many cases it is necessary to remove the kettle from the jacket and install a new one, work which is generally done by unskilled labor, and particularly where the kettles are heavy and awkward to handle or lined with enamel, or both, the unskilled labor employed is apt to injure the kettle or the enamel thereon in such operation. It is well known that particularly for acid-proof enamel ware, if the enamel is cracked or broken the acid soon eats away the metal wall of the kettle and destroys it. I aim to produce means for enabling even unskilled labor to remove an old kettle and install a new one without danger to the delicate parts which I have mentioned.

The particular invention of this application relates to means employed in connection with those kettles which employ a tube or other similar means passing through the jacket wall and the intervening chamber to the outside. I aim also to provide means for firmly packing the neck of the tube to prevent the escape of fluid from the chamber between the kettle and jacket walls.

Other objects of my invention and the invention itself will probably be better understood from a description of an embodiment of my invention.

Figure 1 is a section through parts showing an embodiment of my invention.

Fig. 2 shows a plan and side elevation of a member 6 enlarged, constituting one of the elements of my invention.

Fig. 3 is an enlarged sectional view of the member 7 of Fig. 1.

Fig. 4 is an enlarged top plan view of the member 8 of Fig. 1.

Fig. 5 is an enlarged plan view of a part of the member 7.

Referring now to the drawing and to the embodiment of my invention illustrated therein, at 9 is shown the wall of the kettle and at 10 a pipe or tube which projects from the bottom of the kettle. The end of the tube is provided with an outwardly turned flange 11. In the form shown a layer of enamel is provided upon the inside of the kettle and the inside of the tube. A portion of the jacket is shown at 14. This jacket surrounds the kettle, forming a fluid chamber 15 between the walls of the kettle and the jacket. The wall 14 is provided with an opening 16 big enough to permit the passage of the flange 11 therethrough. A cell or pocket 17 is formed by a wall 18 connected to the bottom of the jacket 14 about the hole 16. The member 18 is preferably cylindrical in form and its outer edge is provided with an annular flange 19 turned outwardly, substantially perpendicular to the walls 18. This flange is provided with a plurality of openings 20.

A collar 21 is mounted about the neck and next adjacent the wall 14 of the jacket. This collar is formed of complementary parts 22 and 23, which, when in position, are fastened together by any suitable fastening means passing through the openings 24. These parts are mortised and can be separately removed from the neck so as to be able to mount the member 21 on the neck notwithstanding the flange 11. Next after the member 21 a mass of packing 25 is placed around the neck 10 and next after that, a packing ring 26 which is formed of a plurality of parts, preferably two parts. A recess 28 is formed in the upper corner of the member 26 and extends around the periphery of the same. A retaining ring 29 provided with a plurality of openings 30 is connected to the flange 19 by suitable means, such as bolts 32. The member 29 is provided with an opening 33 and the portion 34 of the member 30 around the opening 33 extends into the recess 28 of the member 26.

When the parts are assembled, as shown in the drawing, the nuts can be drawn down and the parts forced together, compressing the packing 25 and forming a gas-tight, leak-tight joint about the neck 10, without exerting any appreciable pressure upon the neck and thereby not endangering the enamel, the pressure exerted by the member 29 being parallel to the walls of the neck 10.

I have shown this particular embodiment and the particular details for the purpose of illustrating my invention. I do not wish to be limited to this form and these details, but contemplate many departures therefrom without departing from the spirit of the invention.

I claim:—

1. In a device of the class described, the combination of an enameled kettle, an enameled tube leading into said kettle, a flange on the end of the tube, a jacket about said kettle provided with an opening through which the tube projects, said opening being larger than the flange on the tube, a chamber being formed between the kettle and the jacket walls, an annular collar around the opening in the jacket wall forming a packing cell or pocket, a flange on the outer edge of said collar, an annular member in the bottom of the packing cell next to the jacket wall formed of two pieces detachably connected together, a mass of compressible packing in said cell next adjacent said annular member, a hollow cylindrical-shaped metal packing member next to the compressible packing, said member being provided with an annular recess on the outside edge, a flat ring and means to connect said ring to the flange on the packing pocket wall, said ring projecting in to the recess in the metal packing member.

2. In a device of the class described, the combination of an enameled kettle, an enameled tube projecting from the walls of said kettle, said tube being provided with a flange on its outside end, a jacket about said kettle provided with an opening large enough to permit said flange to pass therethrough, means forming a packing cell on the outside of said kettle wall about said opening provided with an outwardly turned flange at its open end, an annular member in the bottom of said cell surrounding the tube and adapted to furnish a back for the packing, a mass of compressible packing in said cell surrounding said tube and resting against said annular member, a cylindrical ring of metal packing mounted on top of said compressible packing in said cell, said ring being provided with a recess about its outside top edge, a flat ring mounted over said packing with its inner edge projecting into said recess and engaging said metal packing, the flange on the packing cell and said last named ring each being provided with a plurality of openings and bolts passing through said openings connecting said ring and said flange together by means of which the packing may be forced down against the kettle wall, closing the opening therein and acting in a direction parallel to the walls of the tube.

In witness whereof, I have signed my name hereunto this 14th day of March, 1916.

RUDOLF F. GOECKE.

Copies of this patent may be obtained for five cents each, by addressing the "Commissioner of Patents, Washington, D. C."